United States Patent Office 2,697,917
Patented Dec. 28, 1954

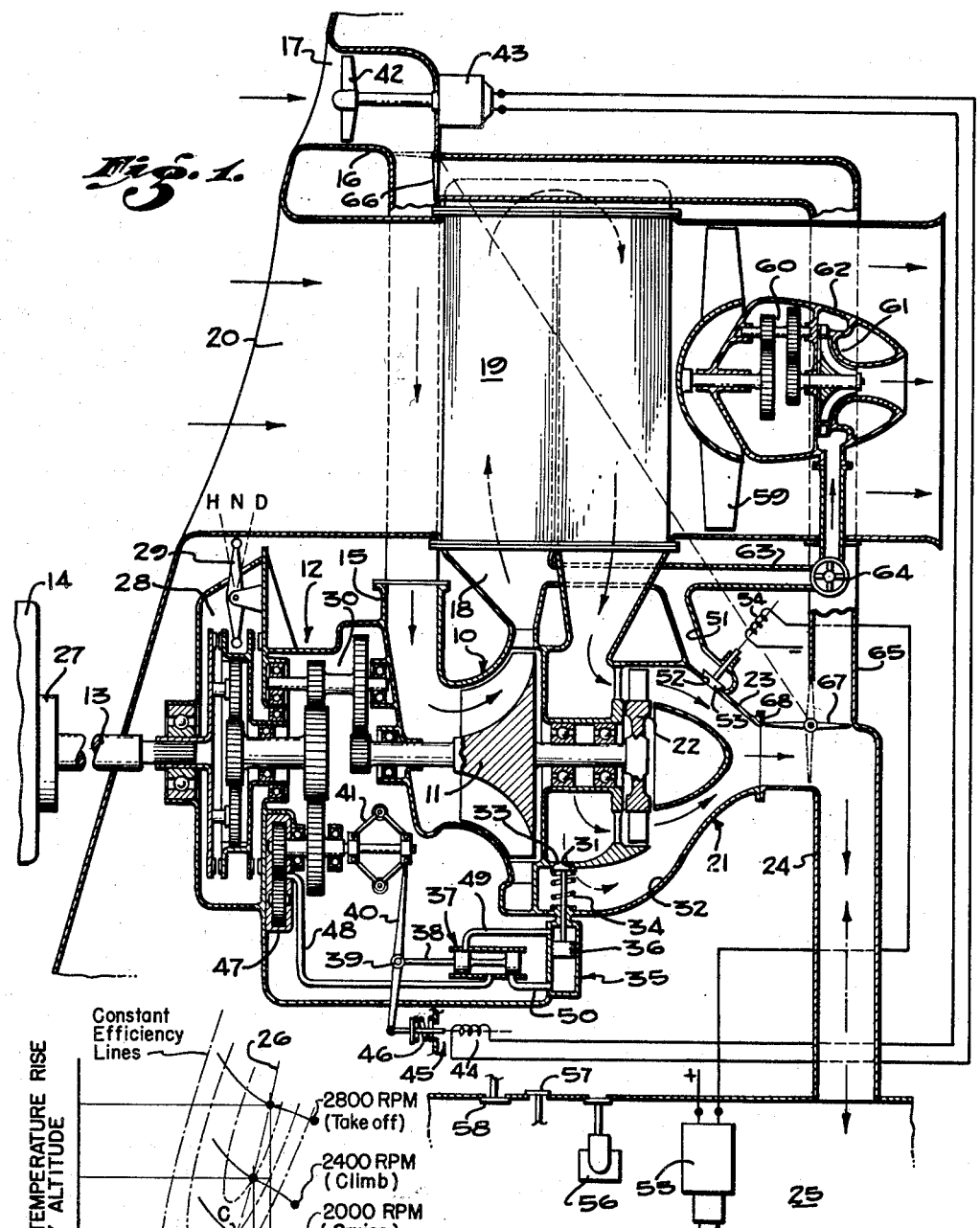

2,697,917

AIR CONDITIONING APPARATUS FOR ENCLOSURES OF AIRCRAFT

Waldemar F. Mayer, Los Angeles, Calif., assignor to The Garrett Corporation, Los Angeles, Calif., a corporation of California Application September 15, 1951, Serial No. 246,856

14 Claims. (Cl. 62—6)

The present invention relates generally to air conditioning, and is more particularly concerned with novel apparatus for the air conditioning and ventilation of enclosures generally, and is specially adapted for enclosures such as the compartments and cabin spaces of aircraft.

Heretofore in engine driven aircraft, it has been the practice in conventional air conditioning systems to supply a constant weight air flow to the aircraft cabin. Such arrangements necessitated the utilization of a variable ratio transmission in order to comply with the variations in engine speed and/or in density of the ambient air.

The apparatus of the present invention differs from conventional systems in that a fixed ratio of speed transmission is utilized while the plane is in flight, and an auxiliary speed changer is added for increasing the speed of operation of the compressor for ground cooling in the summer. Thus, during flight, the compressor operates at different speeds in accordance with the operational requirements of main engine operation, for example, during "take off," "climb" and "cruise" conditions. The compressor will supply a nearly constant volume air flow to the aircraft cabin, yielding a more uniform ventilating flow through the cabin at different cabin pressures. Novel control is provided for modulating the air cooling in response to speed changes and variation in the intake flow rate of the compressor.

For ventilating the enclosure, when the aircraft is on the ground, unique valving is provided so that the intake of the compressor may be connected to the enclosure, whereupon ambient air is drawn into the enclosure for ventilating purposes.

According to the general concept of the present invention, it is one object to provide air conditioning apparatus for supplying conditioned air to an enclosure, wherein air pumping means may be driven by a power device which may be operated at different speeds under predetermined conditions of operation, novel means being arranged to modulate the air from the pumping means so as to maintain required pressure and temperature valves in the enclosure.

Such apparatus is particularly useful in aircraft as it permits driving of air pumping devices from a main engine, thus eliminating the necessity for variable ratio transmission by which the air pump might supply a substantially constant weight air flow to the enclosure.

A further object of the invention is to provide in air conditioning apparatus, improved control means for controlling pressure and temperature of fluid for conditioning an enclosure in response to variations in driving speed of the pumping means for supplying said fluid, and variations in the velocity of fluid intake to the air pumping means, or variation in temperature rise across the air pumping means.

A further object of the invention is to increase the air flow rates and cooling capacity of a compressor for a given permissible engine torque, by feeding back energy recovered from compressed air delivered by the compressor.

A still further object is to provide air conditioning apparatus of the character described, which is operable, for example, in the case of aircraft for cooling an enclosure during flight or when on the ground, but which may readily be modified as to its operation on the ground so as to merely circulate ambient air through the enclosure for ventilating purposes.

Further objects of the invention will be brought out in the following part of the specification, wherein detailed description is for the purpose of fully disclosing the invention without placing limitations thereon.

Referring to the accompanying drawings, which are for illustrative purposes only:

Fig. 1 is a view diagrammatically illustrating air conditioning apparatus embodying the features of the present invention; and Fig. 2 is a typical curve for an air conditioning system embodying the present invention, and showing the points of control for four basic operational requirements of an aircraft.

Referring now generally to the drawings, for illustrative purposes, the air conditioning apparatus of the present invention is shown in Fig. 1 as comprising a centrifugal type air compressor 10 which has its impeller 11 operatively connected through speed changer 12 to the drive shaft 13 of an aircraft main engine 14.

The compressor 10 has an inlet connection 15 connected through a supply duct 16 having an intake end opening 17 in communication with a supply source of cabin air, in this instance ambient air.

The compressor 10 has an outlet connection 18 with a heat exchanger 19 through which compressed air from the compressor 10 is conducted in heat exchange relation with coolant air furnished to the heat exchanger through a duct passage 20 from a coolant source of supply, which in this instance is ambient air.

From the heat exchanger 19, the air cooled therein is conducted to expansion cooling means, which in this instance consists of an air turbine 21 of the axial type having its rotor 22 operatively supported and connected with the impeller 11 of the compressor so as to serve as a mechanical energy recovery device. The turbine 21 connects at its outlet 23 with a duct 24 by which the conditioned air is conducted to an enclosure 25, such as a compartment or cabin of an aircraft.

The component parts of the air conditioning apparatus as thus far described, are in their broad aspect the same as incorporated in a conventional air conditioning system wherein it is the practice to supply a constant weight air flow to the enclosure. However, instead of utilizing a variable ratio transmission so as to maintain a practically constant air weight flow rate it is proposed to operate the compressor of the present invention at speeds which correspond with the operational speed requirements of the main aircraft engine.

In this respect, there are four basic operational requirements, namely:

1. Ground cooling when engine runs at 1200 R. P. M.
2. Take off at low altitudes at 2800 R. P. M.
3. Climb to altitude at 2400 R. P. M.
4. Cruise at high altitudes at 2000 R. P. M.

While ambient air pressure and temperature varies very greatly, the cabin air has to be conditioned to comfortable values. As shown in the curve in Fig. 2, utilization of a centrifugal type compressor gives pressure and temperature rises which increases rapidly with engine speed, while the volume flow rate does not vary so rapidly. It therefore is evident that in order to prevent any surging of the compressor and to obtain efficient operation, it is necessary to control the function of the apparatus.

The selected control line 26 produces a satisfactory average operation, and by regulating the apparatus in a manner to hereinafter be explained to give operating points at the intersections of the control line and the respective speed lines, for example, point C for 2000 R. P. M., compressor speeds directly following the main engine speed may be utilized.

Referring again to Fig. 1, a slippage or torque limiting clutch 27 connects the main engine 14 with the shaft 13 in order to prevent overload torques being transmitted to the speed changer and connected compressor and air turbine, thus providing a protective safety feature against damage to these devices.

The speed changer 12 incorporates an auxiliary planetary change gear section 28 which may be actuated by means of a control lever 29 from a neutral disconnected position "N" to selective positions "H" or "D." In the former position, the compressor is connected for high speed operation, for example, in the ratio of 2.33:1, while in the latter position the compressor is connected for direct operation, for example, 1:1 ratio. Another section 30 of the speed changer incorporates speed increasing gearing in the ratio of, for example, 10.3:1 so as to increase the impeller speed of the compressor to as much as 40,500 R. P. M. at 2800 R. P. M. engine speed.

The inlet side of the air turbine 21 is connected through a port opening 31 and flow passage 32 to provide a bypass connection between the inlet side of the turbine and its outlet 23 under control of a valve 33 which is arranged to adjustably seat in the port opening 31. This valve is controlled in its position coactively in response to speed changes and variations in flow-rate or intake volume of air to the compressor 10 as will now be explained.

The valve 33 is normally biased toward closed position by a spring 34, while the valve opening position is adjusted and varied by means of a servo-motor 35 or other suitable control means. As shown, the servo-motor contains a piston 36 which is operatively connected with the valve 33. The movement of the piston is controlled by a pilot valve 37 having an actuating stem 38 which connects to an intermediate point 39 of a floating lever arm 40.

Speed changes are carried to one end of the lever arm 40 from a centrifugal regulator 41.

The intake volume of air being supplied to the compressor 10 is measured by speed of a flow-rate meter fan 42 which is positioned in the duct 16 in the path of air flow therein. This fan is connected with a generator and amplifier 43 which is electrically connected to energize a solenoid coil 44 of solenoid 45, this solenoid being spring loaded by spring 46. The solenoid is connected to the opposite end of the floating lever arm 40 to that at which the centrifugal regulator is connected.

Movements of the floating lever arm are carried to the pilot valve 37, the operation of which controls the application of fluid pressure, which may be from an oil pump, as shown at 47, having a supply connection with the pilot valve through a conduit 48. The pilot valve acts to selectively place oil pressure above or below the piston 36 through connections 49 or 50, respectively, or shut off these connections to lock the piston 36 in a position of its adjusted movement.

Cabin temperature control is regulated by providing a bypass connection 51 between the outlet connection 18 of the compressor and the outlet 23 of the air turbine 21 to which the flow is conducted through a port opening 52 which is controlled by means of an associated valve 53. This valve is electrically controlled, in this instance by a solenoid having an actuating coil 54 which is energized to open under control of a cabin thermostat 55.

Conventional pressure regulating valves are indicated, for example, a suitable valve 56 regulates the cabin air pressure, a pressure relief valve 57 being provided to open upon maximum predetermined amount of cabin pressure, and vacuum relief valve 58 being provided to open upon the occurrence of a minimum predetermined value of cabin pressure. These valves operate in a manner well understood in the art, and further description is thought unnecessary.

During flight operations of the aircraft, coolant air is supplied to the heat exchanger 19 by ram air flow through the duct passage 20. However, on the ground, during no flight condition, other means must be provided for circulating coolant through the heat exchanger. This is accomplished by providing an air moving device in the duct 20. This device is shown in the present instance as comprising a fan 59 having a driving connection through a speed increaser 60 with a driving air turbine 61. The component parts of this unit are streamlined and mounted in a nacelle housing 62 positioned on the discharge side of the heat exchanger 19 so as to provide suction flow of coolant air therethrough during operation. The air turbine is supplied with operating air from outlet connection 18 through a bleed connection 63, a control valve 64 being interposed in the bleed connection for manually controlling the operation of the air turbine.

The apparatus of the present invention is further arranged to act merely as ventilating apparatus by means of which ambient air may be circulated or drawn into the cabin by actuation of the compressor 10.

For this purpose, a flow duct 65 interconnects the duct 24 with the compressor inlet duct 16. The ends of the duct 65 are normally closed by butterfly valves 66 and 67, the latter valve also being arranged in normal position to close an overboard discharge port opening 68. These valves are interconnected for concerted operation, and when actuated to their dotted line positions, air may be drawn from the cabin 25 through the duct 65 by the action of the compressor 10, and discharged overboard through the opening 68. In this position of the valves, inlet flow to the compressor through opening 17 is cut off, and also flow from outlet 23 directly into duct 24 is cut off.

Operation of the air conditioning apparatus of the present invention will now be further considered. During flight, the lever 29 of the planetary change gear section of the speed changer is set for direct drive at position "D," and the valve 64 is closed since ram coolant air will be supplied to the heat exchanger 19.

Let it now be assumed for purposes of discussion that the engine 14 is operating at a given constant speed, for example, 2000 R. P. M. The air intake volume and temperature rise under such conditions will be approximately as indicated by point C on the speed curve for 2000 R. P. M. as shown in Fig. 2. The intake volume of the compressor 10 is measured by the meter fan 42 which will energize the solenoid coil 44, each flow-rate determining a certain solenoid position. Engine speed is registered by the centrifugal regulator 41. The operating effect of the centrifugal regulator and the solenoid 45, when operating on the control line 26, as shown in Fig. 2, is laid out so that the pilot valve 37 is in neutral position locking the valve 33 in its proper position for the assumed condition of operation.

Change in engine speed will act through the centrifugal regulator to actuate the pilot valve to set the valve 33 into the required new position, and the change in the intake volume flow to the compressor acts to restore the pilot valve to its neutral position shutting off connections 49 and 50 so as to lock the servo-motor at the new position of the valve 33. For example, assuming that the speed is increased, the centrifugal regulator 41 will swing the connected end of floating lever arm 40 in a counterclockwise direction so as to move the pilot valve toward the left, whereupon oil pressure is supplied through connection 49 to the top side of piston 36, with the result that the valve 33 moves downward to a further opened position so as to bypass a greater amount of air around the air turbine 21. Increased volume of intake air to the compressor 10 will more strongly energize the solenoid coil 44 which will now act to move the lower end of the floating lever arm 40 in a counterclockwise direction thus restoring the pilot valve 37 to its neutral position locking the piston 36 in a new operating position of valve 33.

For ground cooling, the lever 29 is moved to "H" position which will lock the ring gear of the planetary gearing to the frame so as to actuate the compressor at high speed. Under such conditions, the compressor will deliver high temperature, high pressure air. A portion of this air is bled off through connection 63 by opening the valve 64 to permit delivery of actuating air to the turbine 61. The fan 59 being thus motivated causes flow of coolant air through the duct passage 20 of the heat exchanger 19. Air from the compressor 10 is thus first cooled in the heat exchanger 19 and from there is further cooled and reduced in pressure by passage through the air turbine 21. Temperature control of the cabin is accomplished as previously described by controlling flow through the bypass connection 51 by means of valve 53 in response to cabin thermostat changes.

Under certain conditions, it may be desirable to merely ventilate the cabin or enclosure rather than to provide cooling as just described above. Since this operation does not utilize the heat exchanger 19 the valve 64 may be closed and the circulation of coolant to the heat exchanger discontinued. For ventilating the cabin, the valves 66 and 67 are actuated to dotted line positions as shown in Fig. 1. This connects the duct 65 between duct 24 and duct 16 so that the operation of the compressor 10 will now draw intake air from the cabin, the air flow through duct 24 being in reverse direction to its direction of flow when cooling the cabin. Ambient air is thus drawn into the cabin. The discharge from the compressor passes through the air turbine for mechanical energy recovery, and is discharged overboard through opening 68.

Various modifications may suggest themselves to those

I claim:

1. Air conditioning apparatus operable from a main engine of an aircraft for conditioning an enclosure thereof, comprising: pumping means for air to be delivered to said enclosure driven by said engine in accordance with its respective speeds under varied operational requirements; cooling means for cooling the air from said pumping means including an expansion air turbine; a bypass around said turbine; a valve in said bypass; a fluid pressure actuated servomotor for motivating said valve; a pilot valve for controlling said servomotor connected between the ends of a floating lever arm; speed responsive means connected to one end of said lever arm; and flow rate responsive means for the intake of said pumping means connected to the opposite end of said lever.

2. Air conditioning apparatus operable from a main engine of an aircraft for conditioning an enclosure thereof, comprising: pumping means for air to be delivered to said enclosure driven by said engine in accordance with its respective speeds under varied operational requirements; cooling means for cooling the air from said pumping means including an expansion air turbine; a bypass around said turbine; a fluid pressure controlled valve in said bypass; means for controlling said valve including a floating lever arm; speed responsive actuating means connected to said arm, and electro-magnetic actuating means connected to said arm, responsive to the intake flow rate of said pumping means.

3. Air conditioning apparatus operable from a main engine of an aircraft for conditioning an enclosure thereof, comprising: pumping means for air to be delivered to said enclosure driven by said engine in accordance with its respective speeds under varied operational requirements; cooling means for cooling the air from said pumping means including an expansion air turbine; and bypass around said air turbine controlled in accordance with said engine speed and the intake flow rate of air to said pumping means.

4. Air conditioning apparatus operable from a main engine of an aircraft for conditioning an enclosure thereof, comprising: pumping means for air to be delivered to said enclosure driven by said engine and in accordance with its speed under varied operational requirement conditions; cooling means for cooling the air from said pumping means; and a bypass around said cooling means controlled in accordance with said engine speed and the intake flow rate of air to said pumping means.

5. Apparatus for moving a controlled flow of fluid into an enclosure, comprising: a flow path for conducting said fluid under pressure to said enclosure; a fluid pump; power means for actuating said pump including a power recovery device driven by said fluid and acting to cool said fluid; a fluid bypass around said device; and means for controlling fluid flow through said bypass in response to variations in velocity of fluid entering said pumping means.

6. Apparatus for moving a controlled flow of fluid into an enclosure, comprising: a flow path for conducting said fluid under pressure to said enclosure; a fluid pump; power means for actuating said pump including a power recovery device driven by said fluid and acting to cool said fluid; a fluid bypass around said device; and means for regulating fluid flow through said bypass in response to speed variations of said power device.

7. Air conditioning apparatus for an enclosure comprising: power driven air pumping means having an outlet; an air expansion turbine having an inlet and an outlet, the outlet being connected with said enclosure; a heat exchanger having flow paths in heat exchange relation, one of said paths connecting said pumping means outlet and said turbine inlet, and the other of said paths being connected with a coolant source; a bleed connection with the outlet of said pumping means; and an air moving means activated by bleed air from said connection for circulating said coolant.

8. Means for conditioning an enclosure, comprising: power driven air pumping means having an inlet and outlet; air cooling means having an inlet and an outlet, the inlet of which is connected to the outlet of said air pumping means; duct means normally connecting said cooling means outlet to said enclosure, whereby cooled air normally flows into said enclosure through said duct; and a connection including valve means exterior of said enclosure for selectively disconnecting said duct means with respect to said cooling means, and connecting said duct to said air pumping means inlet, whereby air flow through said duct means is reversed and air is pumped from said enclosure by operation of said pumping means.

9. Means for conditioning an enclosure, comprising: power driven air pumping means having an inlet and outlet; air cooling means connected to receive pumped air from said pumping means outlet; duct means for normally conducting air to said enclosure from said air cooling means, whereby cooled air normally flows into said enclosure; and means for selectively disconnecting said duct means with respect to said cooling means and connecting it to said inlet, whereby air is pumped from said enclosure by operation of said pumping means.

10. The method of conditioning air for an enclosure of an aircraft having a main engine, which comprises the steps of: pumping the conditioning air in accordance with main engine operating speeds; conducting the pumped air to said enclosure through a path including parallel portions; cooling the air in one of said portions by passing through an expansion air turbine; and controlling flow through the other portion in accordance with the main engine speed and pumping intake flow rate.

11. The method of conditioning air for an enclosure of an aircraft having a main engine, which comprises the steps of: pumping the conditioning air in accordance with main engine operating speeds; conducting the pumped air to said enclosure through a path including parallel portions; cooling the air passing through one of said portions; and controlling flow through the other portion in accordance with the main engine speed and pumping intake flow rate.

12. Means for conditioning an enclosure, comprising: power driven air pumping means having an inlet and outlet; air cooling means, first duct means connecting said outlet to said enclosure through said air cooling means; an atmospheric discharge port in said duct between said cooling means and said enclosure; a second duct connecting said inlet with said duct means downstream from said cooling means; and valves selectively operable to one position for closing said port and disconnecting said second duct with respect to said first duct means and said inlet, and operable to another position for opening said port and connecting said second duct with said first duct means and said inlet.

13. Means for conditioning an enclosure, comprising: power driven air pumping means having an inlet and outlet; air cooling means; first duct means connecting said outlet to said enclosure through said air cooling means; an atmospheric discharge port in said duct between said cooling means and said enclosure; a second duct connecting said inlet with said duct means downstream from said cooling means; a valve operable to connect and disconnect said second duct at one end with respect to said inlet; and a valve at the other end of said second duct operable to close said port and disconnect said second duct with respect to said first duct, and open said port and connect said second duct with respect to said first duct.

14. Means for conditioning an enclosure, comprising: power driven air pumping means having an inlet and outlet; air cooling means; first duct means connecting said outlet to said enclosure through said air cooling means; an atmospheric discharge port in said duct between said cooling means and said enclosure; a second duct connecting said inlet with said duct means downstream from said cooling means; a valve operable to connect and disconnect said second duct at one end with respect to said inlet; and a valve at the other end of said second duct operable to close said port and disconnect said second duct with respect to said first duct, and open said port and connect said second duct with respect to said first duct; and means for simultaneously actuating said valves.

References Cited in the file of this patent

UNITED STATES PATENTS

| Number | Name | Date |
|---|---|---|
| 2,119,402 | Puffer | May 31, 1938 |
| 2,390,487 | Lawrence et al. | Dec. 4, 1945 |

(Other references on following page)

UNITED STATES PATENTS

| Number | Name | Date |
|---|---|---|
| 2,393,172 | Larrecq | Jan. 15, 1946 |
| 2,474,441 | Sparrow | June 28, 1949 |
| 2,479,991 | Wood | Aug. 23, 1949 |
| 2,557,100 | Morris | June 19, 1951 |
| 2,585,570 | Messinger | Feb. 12, 1952 |

FOREIGN PATENTS

| Number | Country | Date |
|---|---|---|
| 877,267 | France | Sept. 1, 1942 |